United States Patent
Buesing et al.

(10) Patent No.: US 12,060,149 B2
(45) Date of Patent: Aug. 13, 2024

(54) PITCH ANGLE BLOCKING DEVICE

(71) Applicant: AIRBUS HELICOPTERS DEUTSCHLAND GMBH, Donauworth (DE)

(72) Inventors: Moritz Buesing, Augsburg (DE); Bernward Kahl, Kolbermoor (DE); Markus Bauer, Munich (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 7 days.

(21) Appl. No.: 17/445,130

(22) Filed: Aug. 16, 2021

(65) Prior Publication Data
US 2022/0194570 A1    Jun. 23, 2022

(30) Foreign Application Priority Data
Dec. 18, 2020  (EP) .................................... 20400027

(51) Int. Cl.
*B64C 27/32*    (2006.01)

(52) U.S. Cl.
CPC ................... *B64C 27/322* (2013.01)

(58) Field of Classification Search
CPC ....... B64C 27/50; B64C 27/022; B64C 11/28; B64C 11/325; B64C 27/322
See application file for complete search history.

(56) References Cited

U.S. PATENT DOCUMENTS

| | | | |
|---|---|---|---|
| 3,153,455 | A | 10/1964 | Mosinskis |
| 5,951,251 | A | 9/1999 | Mondet et al. |
| 6,695,253 | B1 | 2/2004 | Romani et al. |
| 7,744,349 | B1 | 6/2010 | Dunmire |
| 2004/0026564 | A1* | 2/2004 | Romani ............... B64C 27/50 244/17.11 |

(Continued)

FOREIGN PATENT DOCUMENTS

| | | |
|---|---|---|
| EP | 0027468 B1 | 7/1983 |
| EP | 0668828 B1 | 9/1996 |

(Continued)

OTHER PUBLICATIONS

European Search Report for European Application No. EP 20400027. 7, Completed by the European Patent Office, Dated May 27, 2021, 8 pages.

*Primary Examiner* — Richard Green
*Assistant Examiner* — Ashesh Dangol
(74) *Attorney, Agent, or Firm* — Brooks Kushman P.C.

(57) ABSTRACT

A pitch angle blocking device for blocking the pitch angle of a multi-blade rotor that has neighboring first and second rotor blades in circumferential direction that extend from a rotor hub of a rotary-wing aircraft In non-operational mode of the rotary-wing aircraft. The present embodiments further relate to a multi-blade rotor of a rotary-wing aircraft that is adapted to receiving such a pitch angle blocking device, and to a rotary-wing aircraft with such a multi-blade rotor. The pitch angle blocking device comprises first and second attachment means that are configured to be non-rotatably and releasably attached to the first and second rotor blades spaced apart from the rotor hub, and a connecting device that non-rotatably connects the first attachment means with the second attachment means.

17 Claims, 10 Drawing Sheets

(56) References Cited

U.S. PATENT DOCUMENTS

2005/0211825 A1* 9/2005 Hoynash .................. B64C 3/56
   244/17.11
2018/0155062 A1* 6/2018 Littlejohn ................ B64F 5/50

FOREIGN PATENT DOCUMENTS

| EP | 1996454 A1 | 12/2008 |
| WO | 2007108828 A1 | 9/2007 |

* cited by examiner

A - A

A - A

A - A

A - A

A - A

A - A

A - A

A - A

A - A

A - A

A - A

A - A

A - A

A - A

PITCH ANGLE BLOCKING DEVICE

CROSS-REFERENCE TO RELATED APPLICATIONS

This application claims priority to European patent application No. EP 20400027.7 filed on Dec. 18, 2020, the disclosure of which is incorporated in its entirety by reference herein.

TECHNICAL FIELD

The present embodiments relate to a pitch angle blocking device and, more particularly, to a pitch angle blocking device for blocking the pitch angle of a multi-blade rotor of a rotary-wing aircraft in non-operational mode of the rotary-wing aircraft. The present embodiments also relate to a multi-blade rotor of a rotary-wing aircraft that is adapted to receiving such a pitch angle blocking device and to a rotary-wing aircraft with such a multi-blade rotor.

BACKGROUND

Rotors are usually provided for producing thrust in a predetermined direction during operation. The thrust produced by the rotor blades of a rotor can be controlled in two different ways: either by controlling the rotation speed of the rotor blades around the rotor axis, or by controlling an aerodynamic lift coefficient of the rotor blades. The aerodynamic lift coefficient is usually controlled by adjusting an underlying pitch angle of the rotor blades.

Pitch angle adjustment is also desirable to compensate for asymmetries in air velocity, for example during operation in non-axial inflow fields i.e., when the air flow has a component that is perpendicular to the rotor plane and at the same time a component that is lateral to the rotor plane. In non-axial inflow fields, some rotor blades are rotating against the lateral air flow while others are rotating with the lateral air flow, which leads to unbalanced lift at the different rotor blades, depending on their current position. Unbalanced lift often leads to vibratory stresses on the rotor blades. Controlling the pitch angle of each rotor blade separately according to its rotation position, which is sometimes also referred to as "cyclic pitch control" or "cyclic pitch actuation", may lead to an evenly distributed lift on all rotor blades.

Controlling the pitch angle of rotor blades usually requires the control of flexible joints in rotor assemblies. In actively controlled rotor assemblies, each associated rotor blade is articulated and controlled individually over its azimuth angle of rotation, which often requires complex, heavy, and cost intensive pitch adjustment devices. Such pitch adjustment devices generally include hydraulic actuators that require active control means with external energy supplies to adjust the pitch angle of each rotor blade individually.

Actively controlled rotor assemblies are usually not only provided with cyclic, but also with collective pitch adjustment devices in order to be effective regarding lift and drag.

Conventionally, the cyclic and collective pitch adjustment devices comprise pitch control rods that are moved by a swashplate, or by an axially moveable ring around a respective rotor mast. These elements need to be moved by additional actuators.

However, the pitch angles of the rotor blades often change only a short period of time after the engine that drives the rotor and the associated pitch adjustment devices have been turned off, and the associated rotary-wing aircraft enters a non-operational mode. A rotary-wing aircraft that remains in the non-operational mode for a longer period of time is often stowed in a hangar or in a hangar deck of a ship such as a helicopter carrier or an aircraft carrier. In preparation for stowage of the rotary-wing aircraft, the rotor blades are often folded.

When the rotor blades are folded, they stand nearly perpendicular to their pitch rotation axis, and gravity force, aerodynamic forces caused by wind, and/or other forces (e.g., the acceleration of the ship on which the rotary-wing aircraft is located) would cause a torque moment on the rotor blade root. The torque moment could cause serious damage on the rotor blade attachment and/or the pitch adjustment devices including the hydraulic actuators, the pitch control rods, and the swashplate. Therefore, the pitch rotation of the rotor blades has to be fixed to prevent the rotor blades from performing an undesired downward movement.

Some solutions for blocking the pitch angle of the rotor blades have emerged that block the hydraulic actuators or fix the position of the swashplate or the control rods of the pitch adjustment devices.

For example, document EP 1 996 454 A1 describes a rotor assembly having a rotor hub, a plurality of yokes, and a plurality of swing arms. Each swing arm is movably positioned on the rotor hub for rotation between an unlocked position and a locked position. The yokes are freely movable about a pitch axis and a lead/lag axis when the swing arms are in the unlocked position and the yokes are locked in a predetermined pitch position and a predetermined lead/lag position when the swing arms are in the locked position.

Document U.S. Pat. No. 5,951,251 A describes a locking device that comprises for each blade at least one first subassembly with a fork for locking a finger, one of the fork and finger pivoting on a chassis attached laterally to the hub between the linking members of two neighboring blades, the other element being fixed to the linking member and projecting laterally towards the other linking member so that the pivoting element can be moved between a position in which it is engaged over the finger for locking the blade at least in terms of pitch, and a disengaged position for unlocking.

Document EP 0 668 828 B1 describes a pitch actuation system restraint (PASR) device that provides protection for the pitch actuation system of a helicopter having a main rotor assembly configured for main rotor blade folding operations. The PASR device includes permanent adapter brackets that are permanently mounted in combination with the rotor hub arms and temporary adapter bracket and quick release pins for each main rotor blade to be folded. Prior to implementing blade folding operations, a temporary adapter bracket is secured in combination with the pitch control horn of each main rotor blade and the permanent adapter bracket of the adjacent rotor hub arm by means of the quick release pins. Each temporary adapter bracket and permanent adapter bracket functions as a rigid structural interconnection that effectively locks the pitch control horn in position during blade folding operations such that displacements induced in the main rotor blade during blade folding operations cannot be coupled into the pitch actuation system.

All three documents describe solutions that incur high costs for special equipment that is added to the pitch adjustment device. Moreover, the additional equipment increases the weight of the rotary-wing aircraft and remains with the rotary-wing aircraft in operational mode, thereby decreasing in-flight fuel efficiency of the rotary-wing aircraft.

Therefore, other solutions for blocking the pitch angle have emerged that apply a clamp, bracket, or bolt to the rotor blade or control cuff and connect that clamp, bracket, or bolt with the fuselage, rotor hub, or tail of the rotary-wing aircraft.

For example, document U.S. Pat. No. 7,744,349 B1 describes lock units that are removably appended between the rotor assembly and each blade pitch housing attached to a helicopter blade and that are usable to restrict upward rotation of the helicopter blades. A base portion of a lock unit may be configured to be held in position by a removable pin device. An extendible device extending from the base portion to a surface of a blade pitch housing can be adjusted to press the base portion back against a surface of the rotor assembly. The lock unit thereby restricts these surfaces of the blade pitch housing and rotor assembly from moving closer to each other and thereby restricts upward rotation of the blade pitch housing and its attached helicopter blade. The lock units are readily removable in preparation for returning a helicopter to active use.

Document U.S. Pat. No. 6,695,253 B1 describes that to fold/unfold blades of a rotor, at least one variable-length linear actuator is removably attached to two blades locked in the flight position. A first blade is unlocked, and the actuator is actuated to vary its length and bear against the other blade which remains locked. This causes the first blade to pivot about its pivot axis and move to a folded position where it is again locked. The other blade is then unlocked and the actuator once again actuated but this time bearing against the first blade. In this way the other blade pivots into the folded position where it is again locked. The two locked folded blades may be connected to each other by a link rod. Rotors with three blades, four blades, five and six blades can be folded/unfolded with only two actuators.

Similar devices and methods for folding and unfolding rotor blades are described in EP 0 027 468 B1 and U.S. Pat. No. 3,153,455 A.

SUMMARY

Based on the limitations and drawbacks of the prior art, an objective is to provide a pitch angle blocking device for blocking the pitch angle of a multi-blade rotor of a rotary-wing aircraft in non-operational mode of the rotary-wing aircraft. The pitch angle blocking device should prevent damage to the rotor blade attachments, and, in particular, damage to hydraulic actuators, control rods, and/or the swashplate of the rotor blade pitch control system in non-operational mode of the rotary-wing aircraft. The pitch angle blocking device should be easily installable and removable without adding weight to the rotary-wing aircraft in operational mode. The pitch angle blocking device should also allow for performing advantageous blade folding procedures.

These objectives are solved by a pitch angle blocking device comprising the features of claim 1. More specifically, a pitch angle blocking device for blocking the pitch angle of a multi-blade rotor of a rotary-wing aircraft in non-operational mode of the rotary-wing aircraft, the multi-blade rotor having neighboring first and second rotor blades in circumferential direction that extend from a rotor hub, comprises first attachment means configured to be non-rotatably and releasably attached to the first rotor blade spaced apart from the rotor hub; second attachment means configured to be non-rotatably and releasably attached to a second rotor blade spaced apart from the rotor hub; and a connecting device that non-rotatably connects the first attachment means with the second attachment means.

The principle of the pitch angle blocking device is to apply a bracket to a rotor blade or to the control cuff of a rotor blade assembly and connecting this bracket to another rotor blade or to the control cuff of another rotor blade assembly. Thus, two brackets can be attached to two adjacent rotor blades or to two control cuffs of two adjacent rotor blades, and these two brackets can be connected to each other.

Conventionally, a rotary-wing aircraft's main rotor (e.g., the main rotor of a helicopter) has three degrees of freedom for the pitch angles of all rotor blades, while a tail rotor or propeller with adjustable pitch only has one degree of freedom. A pair of brackets between two rotor blades can constrain (i.e., block or fix) one or two of the degrees of freedom of the rotor based on the particular implementation of the pair of brackets.

The pair of brackets can be attached to the rotor blade or the control cuff of the rotor blade by means that can transfer torsion loads of the rotor blade or rotor blade control cuff. There are many means for this torsion transferring connection that are state of the art. For example, such a torsion transferring connection may include two or more fasteners such as pins, bolts, or clamps. The two or more fasteners may be attached to holes, slots, rails, and/or dovetails or similar devices on the rotor blades or control cuffs of the rotor blades. Alternatively, the two or more fasteners may form a cuff that fits the outer shape of the rotor blade or the control cuff of the rotor blade. For example, selecting a non-circular cross section for the cuff may enable the transfer of torque from the rotor blade or control cuff of the rotor blade via the cuff with non-circular cross section.

Fixing or blocking the pitch angles of the rotor blades may enable advantageous blade folding procedures. The above-described pitch angle blocking device can be applied externally to the rotor blades or control cuffs of the rotor blades with minimum flying on board equipment, which reduces the weight of the rotary-wing aircraft in operational mode compared to prior art solutions.

Furthermore, the above-described pitch angle blocking device keeps the rotor control system out of the load path for rotor blade fixation. Moreover, the above-described pitch angle blocking device can be applied externally while the hydraulic system of the pitch adjustment device is active, without the risks involved with installing fixation devices in the powered rotor control system.

According to one aspect, the first attachment means further comprises at least one of a strut, and a fastener that is configured to non-rotatably and releasably attach the strut to the first rotor blade; a bracket that at least partially encompasses the first rotor blade, and at least two fasteners that are configured to non-rotatably and releasably attach the bracket to the first rotor blade; or a non-circular clamp with first and second clamping arms and a fastener that is configured to non-rotatably and releasably attach the first and second clamping arms of the non-circular clamp with each other such that the non-circular clamp encompasses the first rotor blade.

According to one aspect, the second attachment means further comprises at least one of an additional strut, and an additional fastener that is configured to non-rotatably and releasably attach the additional strut to the second rotor blade; an additional bracket that at least partially encompasses the second rotor blade, and at least two additional fasteners that are configured to non-rotatably and releasably attach the additional bracket to the second rotor blade; or an additional non-circular clamp with first and second clamping arms and an additional fastener that is configured to non-rotatably and releasably attach the first and second clamping arms of the additional non-circular clamp with each other such that the additional non-circular clamp encompasses the second rotor blade.

According to one aspect, the fastener and the additional fastener comprise at least one of a threaded rod, a nut, a bolt, a pin, a quick release pin, a bearing, a spherical washer, or an elastic element.

According to one aspect, the at least one of the strut, the bracket, or the non-circular clamp, the at least one of the additional strut, the additional bracket, or the additional non-circular clamp, and the connecting device are integrally formed.

According to one aspect, the connecting device further comprises a first extension that extends from the first attachment means; and a second extension that extends from the second attachment means.

According to one aspect, the connecting device further comprises at least one interface connection that connects the first extension with at least one of the second attachment means or the second extension.

According to one aspect, the at least one interface connection further comprises a length adjustment device that couples the first extension with the at least one of the second attachment means or the second extension and that is configured to adjust a distance between the first extension and the at least one of the second attachment means or the second extension.

According to one aspect, the at least one interface connection further comprises at least one interface fastener that couples the first extension with the at least one of the second attachment means or the second extension.

According to one aspect, the at least one interface fastener comprises at least one of a screw, a nut and a bolt, a threaded rod, or a rivet.

According to one aspect, the at least one interface connection further comprises a slot in the first extension through which the at least one interface fastener is adapted to slide for enabling a displacement of the first extension relative to the at least one of the second attachment means or the second extension.

Furthermore, a multi-blade rotor of a rotary-wing aircraft that is adapted to receiving the pitch angle blocking device described above for blocking the pitch angle of the multi-blade rotor in non-operational mode of the rotary-wing aircraft, comprises a rotor hub; and neighboring first and second rotor blades in circumferential direction that extend from the rotor hub, wherein the first rotor blade comprises first receiving means at a first location that is spaced apart from the rotor hub and configured to receiving at least a portion of a first attachment means of the pitch angle blocking device; and the second rotor blade comprises second receiving means at a second location that is spaced apart from the rotor hub and configured to receiving at least a portion of the second attachment means of the pitch angle blocking device.

According to one aspect, the first receiving means comprise at least one of a threaded rod, a bearing, an elastic element, a threaded hole, or a non-threaded hole.

According to one aspect, the second receiving means comprise a non-circular cross section of the second rotor blade at the second location.

Moreover, a rotary-wing aircraft comprises the multi-blade rotor described above.

BRIEF DESCRIPTION OF THE DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION

Figure 1:
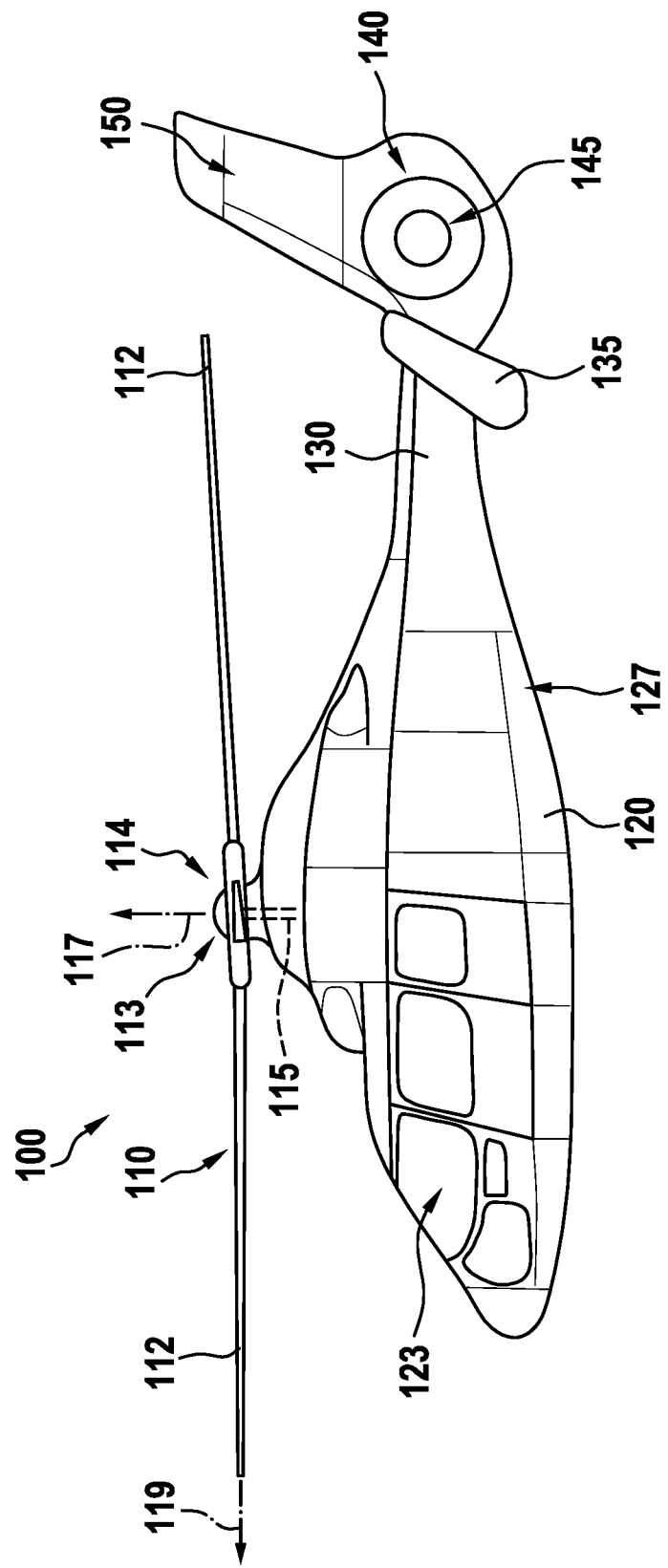
FIG. 1 is a diagram of an illustrative rotary-wing aircraft with a multi-blade rotor in accordance with some embodiments.

FIG. 1 is a diagram of an illustrative rotary-wing aircraft 100 having at least one rotor 110 with a rotor shaft 115. As shown in FIG. 1, the rotary-wing aircraft 100, which is sometimes also referred to as rotorcraft 100, is exemplarily illustrated as a helicopter. Thus, for purposes of simplicity and clarity, the rotorcraft 100 is hereinafter referred to as the "helicopter" 100.

Illustratively, helicopter 100 has a fuselage 120 that forms an airframe of the helicopter 100. The fuselage 120 is connected to a suitable landing gear and exemplarily forms a cabin 123 and a rear fuselage 127. The rear fuselage 127 is connected to a tail boom 130.

By way of example, helicopter 100 may include at least one counter-torque device 140 configured to provide counter-torque during operation, i.e., to counter the torque created by rotation of the at least one rotor 110 for purposes of balancing the helicopter 100 in terms of yaw. If desired, counter-torque device 140 may be shrouded.

The at least one counter-torque device 140 is illustratively provided at an aft section of the tail boom 130 and may have a tail rotor 145. The aft section of the tail boom 130 may include a fin 150. Illustratively, the tail boom 130 may be provided with a suitable horizontal stabilizer 135.

Illustratively, the at least one rotor 110 is a multi-blade rotor 110, for providing lift and forward or backward thrust during operation. The at least one multi-blade rotor 110 comprises a plurality of rotor blades 112 that are mounted at an associated rotor head 114 with a rotor hub 113 to a rotor shaft 115, which rotates in operation of the helicopter 100 around an associated rotor axis 117 in a rotor plane 119.

By way of example, each rotor blade 112 may be connected with the rotor shaft 115 via flexible joints or control cuffs. Thus, each rotor blade 112 may be articulated and controlled individually over its azimuth angle of rotation using pitch adjustment devices that adjust the pitch angle of each rotor blade 112 individually.

If desired, the multi-blade rotor 110 may include cyclic and collective pitch adjustment devices such as pitch control rods, a swashplate, hydraulic actuators, etc. Multi-blade rotor 110 may have three degrees of freedom for the pitch angles of all rotor blades 112, while the tail rotor 145 with adjustable pitch only has one degree of freedom.

In some scenarios, the rotor blades 112 may cause serious damage to the pitch adjustment devices. For example, when the helicopter 100 is stowed in a hangar or in a hangar deck of a ship such as a helicopter carrier or an aircraft carrier, the rotor blades 112 of the multi-blade rotor 110 are often folded to allow for a denser stowage.

When the rotor blades 112 are folded, they stand nearly perpendicular to their pitch rotation axis, and gravity force would cause a torque moment on the rotor blade root that could cause serious damage on the rotor blade attachment and/or the pitch adjustment devices including the hydraulic actuators, the pitch control rods, and the swashplate.

Therefore, the pitch rotation of the rotor blades 112 has to be fixed to prevent the rotor blades 112 from performing an undesired downward movement when folding the rotor blades 112. If desired, a pitch angle blocking device may be mounted to the multi-blade rotor 110 to fix or block the pitch angle of the rotor blades 112 in non-operational mode of the rotary-wing aircraft 100.

For the remainder of this document, a rotor blade 112 is considered to include everything between a rotor hub 113 and a rotor tip. In other words, the rotor blade 112 is considered to include not only the blade itself, but also any control cuff, flexbeam or similar devices onto which a pitch angle blocking device as described below may be mounted.

Figure 2:
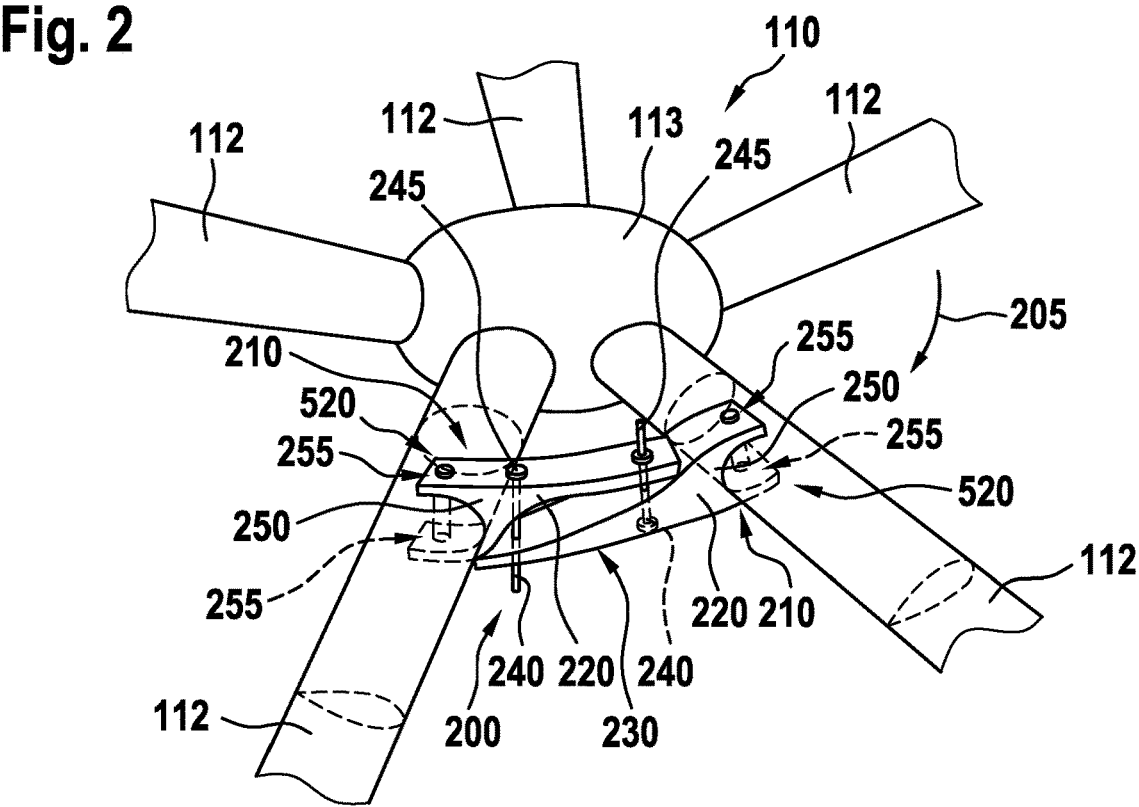
FIG. 2 is a three-dimensional diagram of an illustrative multi-blade rotor of a rotary-wing aircraft with a pitch angle blocking device for blocking the pitch angle of the multi-blade rotor in non-operational mode of the rotary-wing aircraft in accordance with some embodiments.

FIG. 2 is a three-dimensional diagram of an illustrative multi-blade rotor 110 of a rotary-wing aircraft (e.g., helicopter 100 of FIG. 1) with a pitch angle blocking device 200 for blocking the pitch angle of the multi-blade rotor 110 in non-operational mode of the rotary-wing aircraft in accordance with some embodiments.

As shown in FIG. 2, the multi-blade rotor 110 may have five rotor blades 112 that extend from rotor hub 113. If desired, the multi-blade rotor 110 may have more or less than five rotor blades 115. For example, the multi-blade rotor 110 may have three, four, six, seven, or more rotor blades 112.

Illustratively, pitch angle blocking device 200 may be installed on neighboring first and second rotor blades 112 in circumferential direction 205 of the multi-blade rotor 110 to block the pitch angle of the multi-blade rotor 110. Pitch angle blocking device 200 comprises first attachment means 210, second attachment means 210, and a connecting device 230 that non-rotatably connects the first attachment means with the second attachment means 210.

The first attachment means 210 is configured to be non-rotatably and releasably attached to the first rotor blade 112 spaced apart from the rotor hub 113. For example, first attachment means 210 may be attached to first rotor blade 112 at location 520. In other words, the first attachment means 210 is configured to be non-rotatably and releasably attached to the first rotor blade 112 at location 520, which is located at a predetermined distance from the rotor hub 113.

The first attachment means 210 may include at least one of a strut and a fastener that is configured to non-rotatably and releasably attach the strut to the first rotor blade 112, a bracket 250 that at least partially encompasses the first rotor blade 112, and at least two fasteners 255 that are configured to non-rotatably and releasably attach the bracket 250 to the first rotor blade 112, or a non-circular clamp with first and second clamping arms and a fastener that is configured to non-rotatably and releasably attach the first and second clamping arms of the non-circular clamp with each other such that the non-circular clamp encompasses the first rotor blade 112.

As shown in FIG. 2, the first attachment means 210 includes a bracket 250 that encompasses at least half of the first rotor blade 112. Two fasteners 255 non-rotatably and releasably attach the bracket 250 to the first rotor blade 112. If desired, the two fasteners 255 may attach the bracket 250 to the first rotor blade 112 on opposing sides of the first rotor blade 112. For example, one fastener 255 may attach the bracket 250 to an upper portion of the first rotor blade 112, and another fastener 255 may attach the bracket 250 to a lower portion of the first rotor blade 112.

The second attachment means 210 is configured to be non-rotatably and releasably attached to the second rotor blade 112 spaced apart from the rotor hub 113. For example, second attachment means 210 may be attached to second rotor blade 112 at location 520. In other words, the second attachment means 210 is configured to be non-rotatably and releasably attached to the second rotor blade 112 at location 520, which is located at a predetermined distance from the rotor hub 113.

The second attachment means 210 may include at least one of an additional strut, and an additional fastener that is configured to non-rotatably and releasably attach the additional strut to the second rotor blade 112, an additional bracket 250 that at least partially encompasses the second rotor blade 112, and at least two additional fasteners 255 that are configured to non-rotatably and releasably attach the additional bracket 250 to the second rotor blade 112, or an additional non-circular clamp with first and second clamping arms and an additional fastener that is configured to non-rotatably and releasably attach the first and second clamping arms of the additional non-circular clamp with each other such that the additional non-circular clamp encompasses the second rotor blade 112.

As shown in FIG. 2, the second attachment means 210 includes an additional bracket 250 that encompasses at least half of the second rotor blade 112. Two additional fasteners 255 non-rotatably and releasably attach the additional bracket 250 to the second rotor blade 112. If desired, the two additional fasteners 255 may attach the additional bracket 250 to the second rotor blade 112 on opposing sides of the second rotor blade 112. For example, one of the two additional fasteners 255 may attach the bracket 250 to an upper portion of the second rotor blade 112, and another one of the two additional fasteners 255 may attach the bracket 250 to a lower portion of the second rotor blade 112.

If desired, the fastener 255 and the additional fastener 255 may include at least one of a threaded rod, a nut, a bolt, a pin, a quick release pin, a bearing, a spherical washer, or an elastic element.

As an example, the first rotor blade 112 may have two threaded holes, and the two fasteners 255 may be bolts that, together with the threaded holes, fasten the bracket 250 to the first rotor blade 112. As another example, the first rotor blade 112 may have two holes, and the two fasteners may be quick release pins that, together with the two holes, fasten the bracket 250 to the first rotor blade 112.

Illustratively, the connecting device 230 that non-rotatably connects the first attachment means 210 with the second attachment means 210 may include a first extension 220 that extends from the first attachment means 210, and a second extension 220 that extends from the second attachment means 210. As shown in FIG. 2, the first attachment means 210 and the first extension 220 are integrally formed, and the second attachment means 210 and the second extension 220 are integrally formed.

By way of example, the connecting device 230 may include at least one interface connection 240 that connects the first extension 220 with at least one of the second attachment means 210 or the second extension 220. Illustratively, the at least one interface connection 240 may include at least one interface fastener 245 that couples the first extension 220 with the at least one of the second attachment means 210 or the second extension 220. For example, the at least one interface fastener 245 may include at least one of a screw, a nut and a bolt, a threaded rod, or a rivet.

As shown in FIG. 2, the connecting device 230 includes two interface connections 240, each having one interface fastener 245 that couples the first and second extensions 220 with each other. If desired, the two interface fasteners 245 may include two long threaded rods and nuts.

For example, on one end, the threaded rods may be connected via bearings or spherical washers to one of the two extensions 220. A nut and a second bearing or second set of spherical washers may be threaded onto the other end of the threaded rods at the other one of the two extensions 220, thereby fastening the two extensions with each other at the two interface connections 240.

The threaded rods may have a predetermined length. The predetermined length may be selected to allow the clamping length to be shortened from a long clamping length during initial installment of the pitch angle blocking device 200 to a shorter clamping length during the fixation period. Thereby, certain pitch angles may be set on each one of the rotor blades 112. When disassembling the pitch angle blocking device 200, the interface fasteners 245 may be disassembled first. Thus, using long threaded rods may allow to slowly releasing any potential energy stored in the system.

Figure 3:
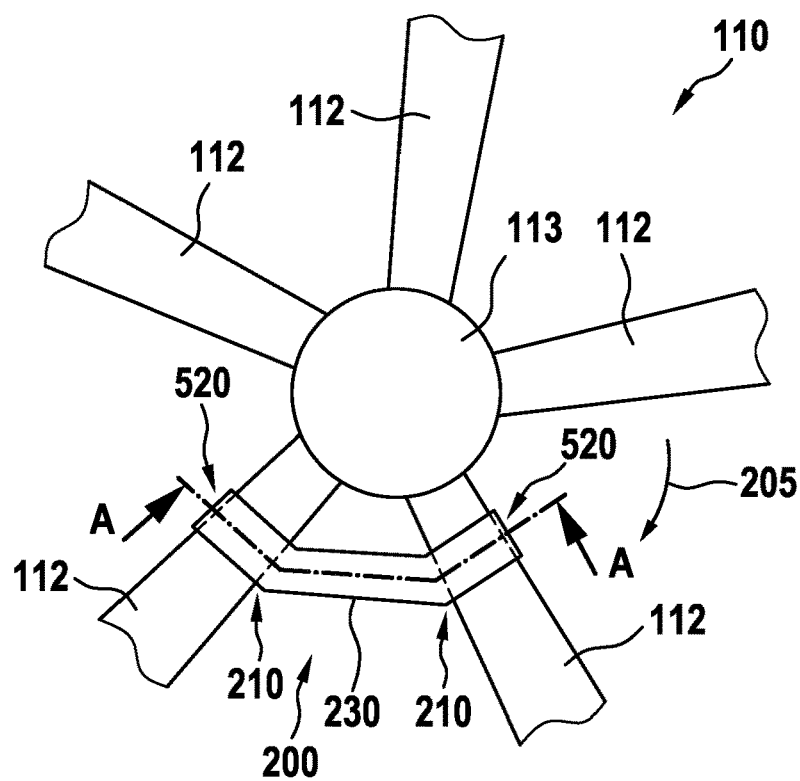
FIG. 3 is a diagram of the illustrative multi-blade rotor with the pitch angle blocking device of FIG. 2 seen from above the rotary-wing aircraft in a direction parallel to the rotor shaft in accordance with some embodiments.

FIG. 3 is a diagram of the illustrative multi-blade rotor 110 of FIG. 2. The multi-blade rotor 110 is adapted to receiving a pitch angle blocking device 200 for blocking the pitch angle of the multi-blade rotor 110 in non-operational mode of the associated rotary-wing aircraft. As shown in FIG. 3, the multi-blade rotor 110 includes a rotor hub 113 and neighboring first and second rotor blades 112 in circumferential direction 205 that extend from the rotor hub 113.

An illustrative pitch angle blocking device 200, which is seen from above the rotary-wing aircraft in a direction parallel to the rotor shaft (e.g., rotor shaft 115 of helicopter 100 of FIG. 1), may be installed on the neighboring first and second rotor blades 112 to block the pitch angle of the illustrative multi-blade rotor 110.

Illustratively, the first rotor blade 112 comprises first receiving means at a first location 520 that is spaced apart from the rotor hub 113 and configured to receiving at least a portion of a first attachment means 210 of the pitch angle blocking device 200. By way of example, the second rotor blade 112 comprises second receiving means at a second location 520 that is spaced apart from the rotor hub 113 and configured to receiving at least a portion of the second attachment means 210 of the pitch angle blocking device 200.

A connecting device 230 non-rotatably connects the first attachment means 210 with the second attachment means 210. Cross sectional diagrams along cut line A-A of illustrative pitch angle devices 200 for blocking the pitch angle of a multi-blade rotor 110 of a rotary-wing aircraft in non-operational mode of the rotary-wing aircraft are shown in FIGS. 4 to 17.

Figure 4:
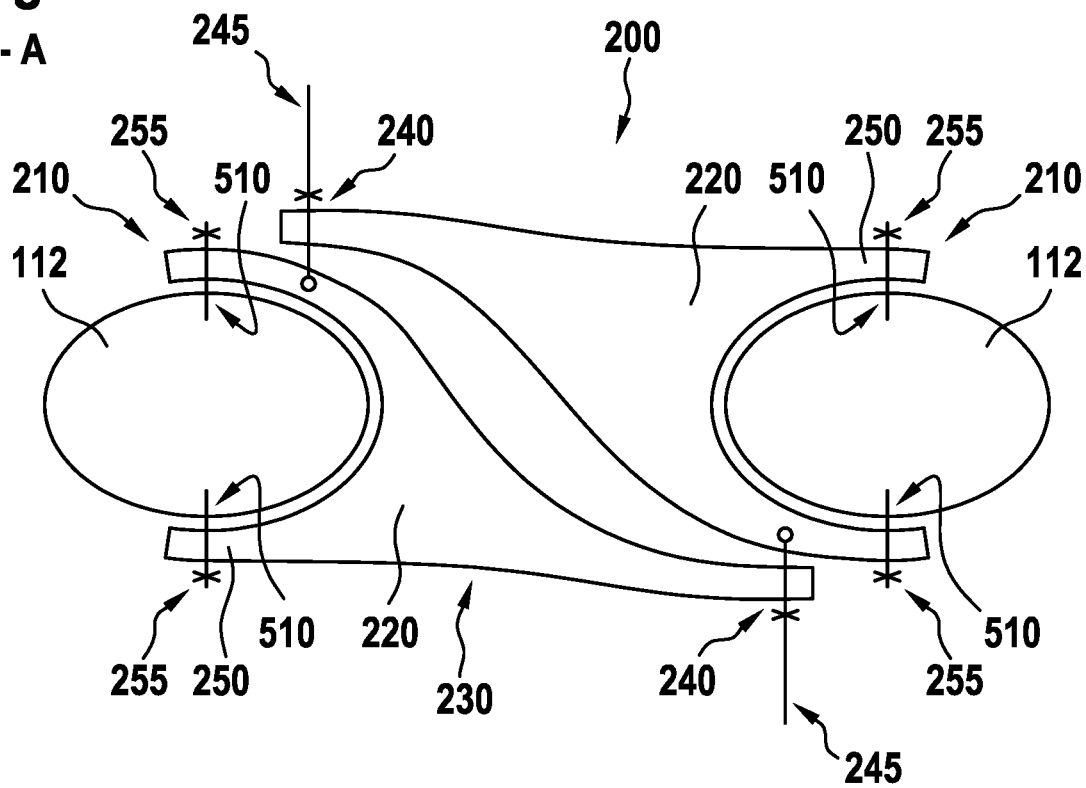
FIG. 4 is a diagram of a cross section of an illustrative pitch angle blocking device with two brackets, two extensions, and two interface connections in accordance with some embodiments.

FIG. 4 is a diagram of a cross section of an illustrative pitch angle blocking device 200 with two brackets 250, two extensions 220, and two interface connections 240.

If desired, respective first and second brackets 250 of the two brackets 250 and respective first and second extensions 220 of the two extensions may be integrally formed.

The two brackets 210 are configured to be non-rotatably and releasably attached to two neighboring rotor blades 112 of a multi-blade rotor (e.g., multi-blade rotor 110 of FIG. 1 to FIG. 3). Each one of the two brackets 250 may at least partially encompass one of the two neighboring rotor blades 112.

Illustratively, at least two fasteners 255 may be configured to non-rotatably and releasably attach each one of the two brackets 250 to a respective one of the two neighboring rotor blades 112. For example, two fasteners 255 may attach one of the two brackets 250 to the first rotor blade 112, and two other fasteners 255 may attach the other one of the two brackets 250 to the second rotor blade 112. The at least two fasteners 255 may include at least one of a threaded rod, a nut, a bolt, a pin, a quick release pin, a bearing, a spherical washer, or an elastic element.

If desired, each one of the two neighboring rotor blades 112 may include two receiving means 510 for receiving the at least two fasteners 255. For example, the first rotor blade 112 may include two first receiving means 510, and the second rotor blade 112 may include two second receiving means 510. The receiving means 510 may include at least one of a threaded rod, a bearing, an elastic element, a threaded hole, or a non-threaded hole.

Illustratively, the four receiving means 510 may all be implemented as a threaded or a non-threaded hole, and the corresponding fasteners 255 may be implemented as quick release pins.

As shown in FIG. 4, the four receiving means 510 may be selected to be of the same type, and the four fasteners 255 may be selected to be of the same type. However, at least one receiving means 510 and the associated fastener 255 may be selected to be of a different type than the other receiving means 510 and fasteners 255. For example, one of the receiving means 510 may be a threaded rod and the corresponding fastener 255 a nut, while the other receiving means are implemented as holes and the corresponding fasteners as quick release pins.

Illustratively, the connecting device 230 may include two interface connections 240. By way of example, each one of the two interface connections 240 may include at least one interface fastener 245 that couples the two extensions 220 with the respective counterpart attachment means. For example, a first interface fastener 245 may couple the first extension 220 of the first bracket 250 to the second bracket 250, and a second interface fastener 245 may couple the second extension 220 of the second bracket 250 to the first bracket 250. If desired, the two interface connections 240 may include at least one of a screw, a nut and bolt, a threaded rod, or a rivet.

As shown in FIG. 4, each one of the two interface connections 240 includes as interface fastener 245 a threaded rod and a nut. The threaded rod is connected to the associated bracket 250 via a bearing or a spherical washer. The threaded rod passes through a hole in the respectively adjacent extension 220, and a nut is threaded onto the threaded rod to fasten the extension 220 with bracket 250.

Figure 5:
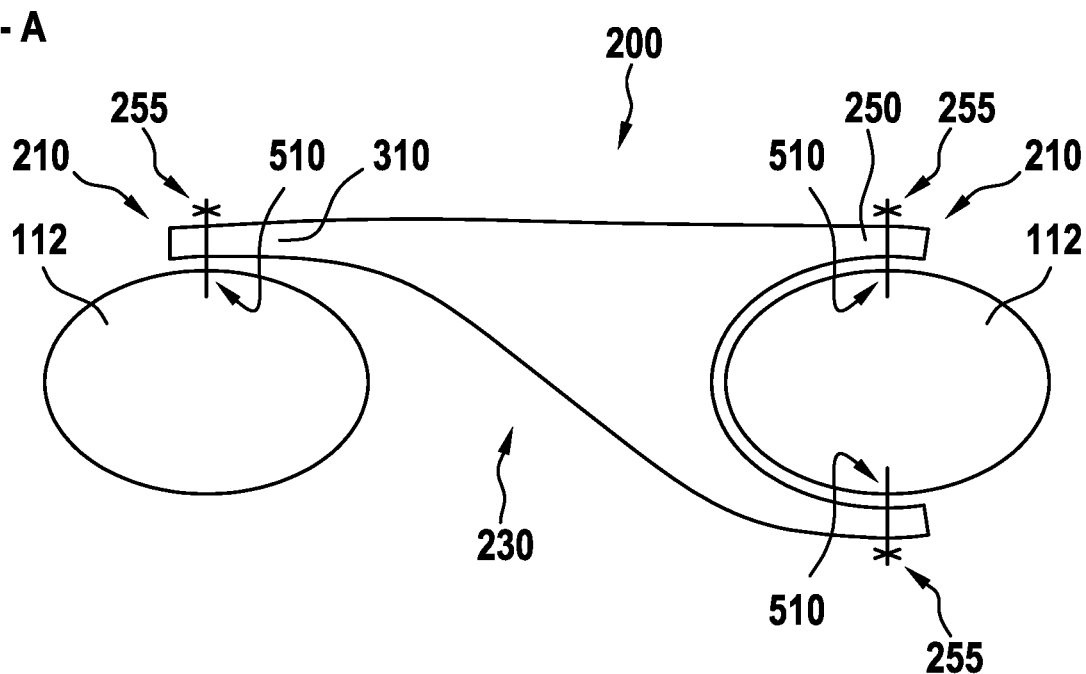
FIG. 5 is a diagram of a cross section of an illustrative pitch angle blocking device with one bracket, one strut, and one extension in accordance with some embodiments.

FIG. 5 is a diagram of a cross section of an illustrative pitch angle blocking device 200 with a connecting device 230 that non-rotatably connects first and second attachment means 210 in accordance with some embodiments.

The first attachment means 210 may include a bracket 250 that at least partially encompasses the first rotor blade 112. The second attachment means 210 may include a strut 310. Illustratively, the bracket 250, the strut 310, and the connecting device 230 are integrally formed.

The first attachment means 210 may further include at least two fasteners 255 that are configured to non-rotatably and releasably attach the bracket 250 to the first rotor blade 112. The second attachment means 210 may further include an additional fastener 255 that is configured to non-rotatably and releasably attach the strut 310 to the second rotor blade 112.

The at least two fasteners 255 and/or the additional fastener 255 may include at least one of a threaded rod, a nut, a bolt, a pin, a quick release pin, a bearing, a spherical washer, or an elastic element.

By way of example, the first rotor blade 112 may include two receiving means 510 for receiving the at least two fasteners 255. The second rotor blade 112 may include only one receiving means 510. Each one of the receiving means 510 may include at least one of a threaded rod, a bearing, an elastic element, a threaded hole, or a non-threaded hole.

Illustratively, the additional fastener 255 and the associated receiving means 510 may be selected to include an elastic element, a bearing, or spherical washers such that the second rotor blade 112 can transfer torsion moments to the pitch angle blocking device 200. If desired, the additional fastener 255 may be selected to be a threaded rod. However, in this case, the pitch angle blocking device 200 may be able to constrain a single degree of freedom of the multi-blade rotor.

Figure 6:
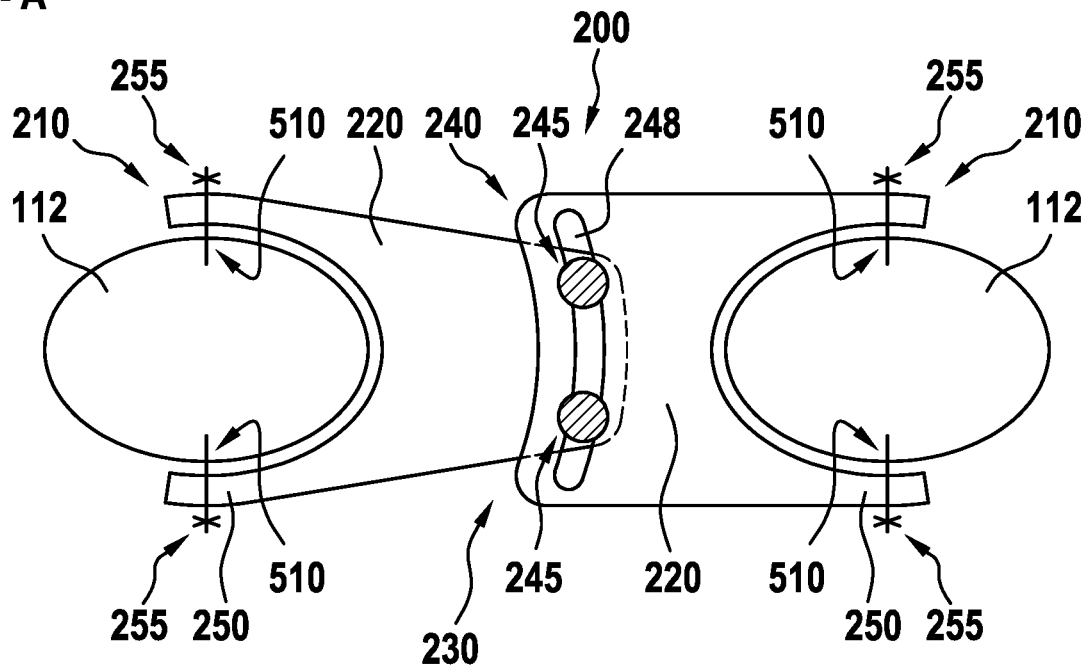
FIG. 6 is a diagram of a cross section of an illustrative pitch angle blocking device with two brackets, two extensions, and one interface connection with a slot in accordance with some embodiments.

FIG. 6 is a diagram of a cross section of an illustrative pitch angle blocking device 200 with a connecting device 230 that non-rotatably connects first and second attachment means 210 in accordance with some embodiments.

The first attachment means 210 may include a bracket 250 that at least partially encompasses the first rotor blade 112 and at least two fasteners 255 that are configured to non-rotatably and releasably attach the bracket 250 to the first rotor blade 112. The second attachment means 210 may include an additional bracket 250 that at least partially encompasses the second rotor blade 112, and at least two additional fasteners 255 that are configured to non-rotatably and releasably attach the additional bracket 250 to the second rotor blade 112.

Illustratively, the connecting device 230 includes a first extension 220 that extends from the first attachment means 210 and a second extension 220 that extends from the second attachment means 210. As shown in FIG. 6, the connecting device 230 further includes an interface connection 240 that connects the first extension 220 with the second extension 220.

Illustratively, the interface connection 240 may include at least one interface fastener 245 that couples the first extension 220 with the second extension 220. By way of example, the interface connection 240 may include a slot 248 in the first extension 220 through which the at least one interface fastener 245 is adapted to slide for enabling a displacement of the first extension 220 relative to the at least one of the second attachment means 210 or the second extension 220.

As shown in FIG. 6, the interface connection 240 may include two interface fasteners 245. The two interface fasteners 245 may be selected to be bolts and nuts that may be slowly released when removing the pitch angle blocking device 200 from the multi-blade rotor.

Figure 7:
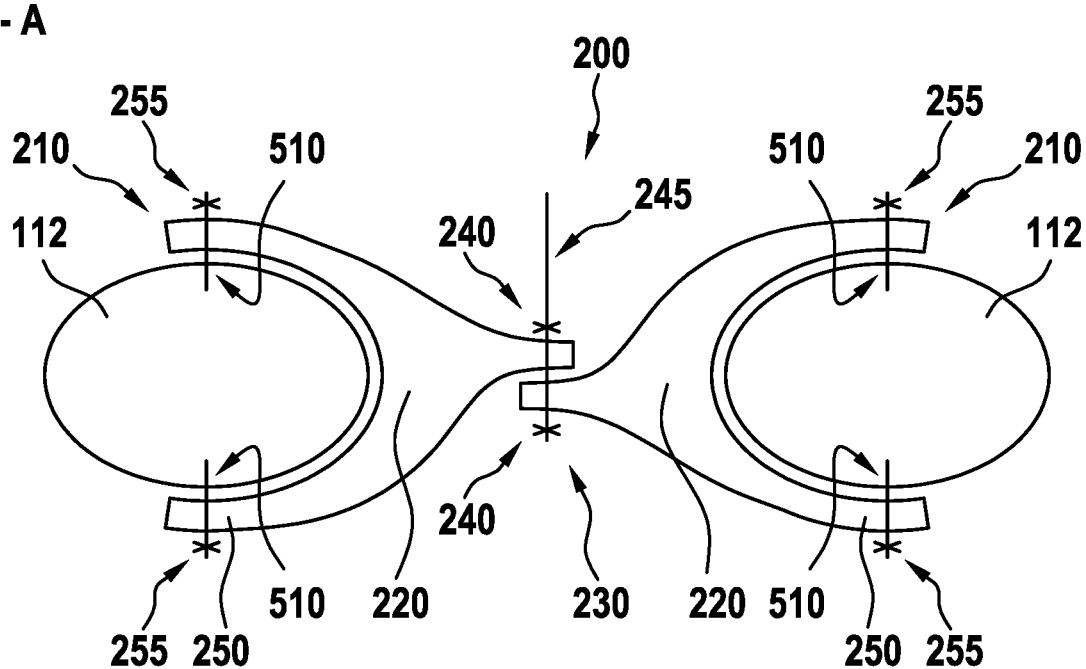
FIG. 7 is a diagram of a cross section of an illustrative pitch angle blocking device with two brackets, two extensions, and one interface connection with an interface fastener in accordance with some embodiments.
Figure 8:
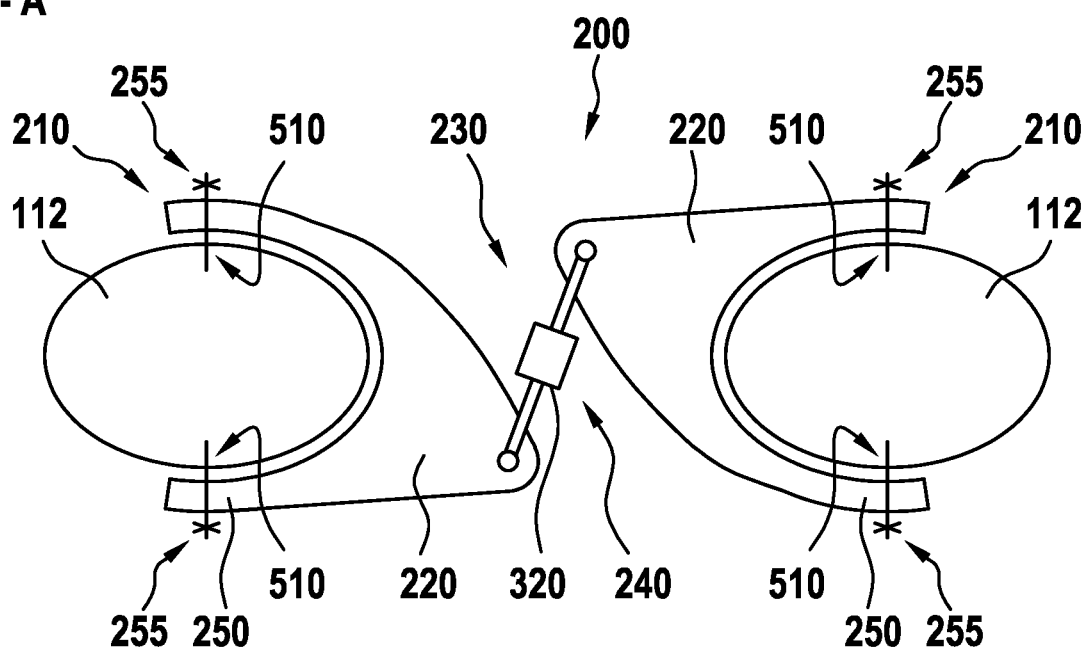
FIG. 8 is a diagram of a cross section of an illustrative pitch angle blocking device with two brackets, two extensions, and an interface connection with a length adjustment device in accordance with some embodiments.

FIGS. 7 and 8 show illustrative pitch angle blocking devices 200 with connecting devices 230 that non-rotatably connect first and second attachment means 210 that are similar to the pitch angle blocking device 200 of FIG. 6.

The pitch angle blocking device 200 of FIG. 7 differs from the pitch angle blocking device of FIG. 6 at least in the connecting device 230. As shown in FIG. 7, the connecting device 230 has first and second extensions 220 with a different cross section shape and a different interface connection 240 than the connecting device 230 of FIG. 6.

Illustratively, the interface connection 240 may include at least one interface fastener 245 that couples the first extension 220 with the second extension 220. For example, the at least one interface fastener 245 may include one or more threaded rods.

The interface connection 240 with only one threaded rod constrains a single degree of freedom for the pitch angles of all rotor blades if the threaded rod is connected to the extensions 220 via bearings, spherical washers, or elastic elements. The interface connection 240 may constrain two degrees of freedom if a single threaded rod is used that functions as a tight fastener and clamps the two extensions 220 together or if two or more threaded rods are used.

The pitch angle blocking device 200 of FIG. 8 differs from the pitch angle blocking device of FIG. 6 at least in the connecting device 230. As shown in FIG. 8, the connecting device 230 has first and second extensions 220 with a different cross section shape and a different interface connection 240 than the connecting device 230 of FIG. 6.

Illustratively, the interface connection 240 may include a length adjustment device 320 that couples the first extension 220 with the at least one of the second attachment means 210 or the second extension 220 and that is configured to adjust a distance between the first extension 220 and the at least one of the second attachment means 210 or the second extension 220.

As shown in FIG. 8, the length adjustment device 320 couples the first extension 220 with the second extension 220. By way of example, the length adjustment device 320 may allow to slowly install and remove the pitch angle blocking device 200.

If desired, the first and second extensions 220 may include receiving means for receiving the length adjustment device 320. For example, the first and second extensions 220 may include holes, hooks, snap hooks, brackets, clamps, plates, bearings, or any combination thereof.

Illustratively, the length adjustment device 320 may include attachment means for connecting the length adjustment device 320 to the receiving means of the first and second extensions 220. As an example, the length adjustment device 320 may include bearings, hooks or snap hooks that are hooked into holes of the first and second extensions 220. As another example, the length adjustment device 320 may include eyelets that are connected with bearings, hooks, snap hooks, or clamps of the first and second extensions 320.

The length adjustment device 320 may be any device that is adjustable in length. As an example, the length adjustment device 320 may include an elastic length adjustment device such as an elastic disk, an elastic band or cord, a spring, etc. As another example, the length adjustment device 320 may include a rigid length adjustment device such as a tension belt, a turnbuckle, a rigging screw, etc.

Figure 9:
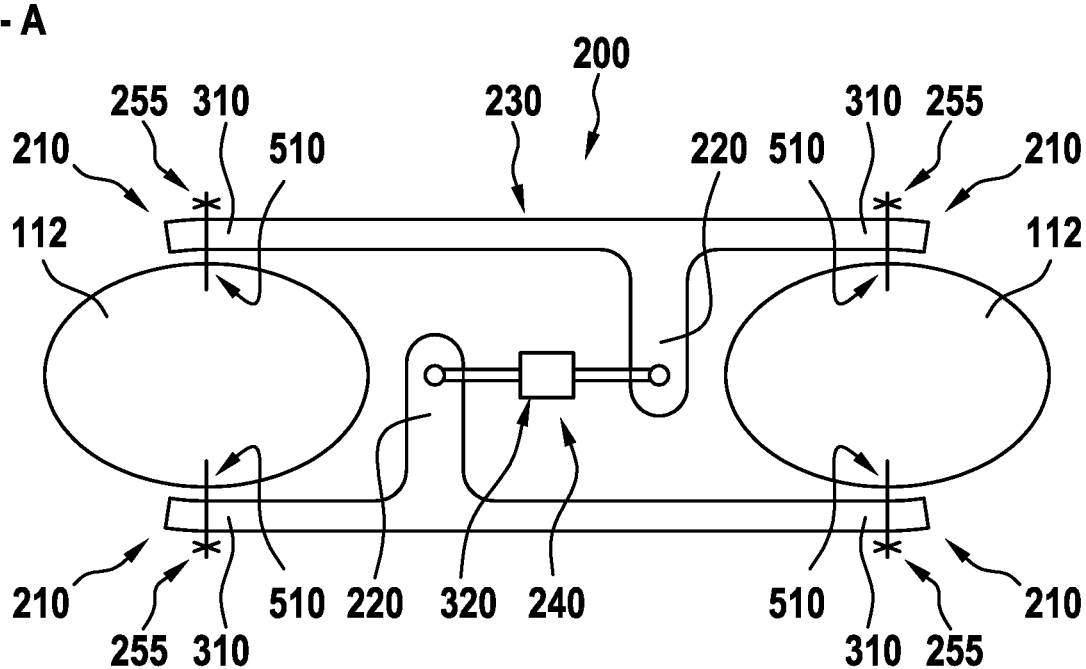
FIG. 9 is a diagram of a cross section of an illustrative pitch angle blocking device with four struts, four extensions, and an interface connection with a length adjustment device in accordance with some embodiments.

FIG. 9 is a diagram of a cross section of an illustrative pitch angle blocking device 200 with a connecting device 230 that non-rotatably connects first and second attachment means 210 in accordance with some embodiments.

The first attachment means 210 may include a strut 310 and a fastener 255 that is configured to non-rotatably and releasably attach the strut 310 to the first rotor blade 112. As shown in FIG. 9, the strut 310 may extend to the second rotor blade 112, and another fastener 255 may attach the strut 310 to the second rotor blade 112.

The second attachment means 210 may include an additional strut 310, and an additional fastener 255 that is configured to non-rotatably and releasably attach the additional strut 310 to the second rotor blade 112. As shown in FIG. 9, the additional strut 310 may extend to the first rotor blade 112, and another additional fastener 255 may attach the additional strut 310 to the first rotor blade.

The fasteners 255 that attach the struts 310 to the first and second rotor blades may include at least one of a threaded rod, a nut, a bolt, a pin, a quick release pin, a bearing, a spherical washer, or an elastic element. Preferably, the fasteners 255 include pins that are connected to the struts 310 and to the rotor blades 112 via bearings, spherical washers, elastic elements, or sufficient clearance in order to allow some rotation angle between the struts 310 and the blades 112. Thereby, the pitch angle blocking device 200 constrains two degrees of freedom of the multi-blade rotor.

Illustratively, the connecting device 230 may include a first extension 220 that extends from the first attachment means 210 and a second extension 220 that extends from the second attachment means 210. By way of example, the connecting device 230 may include an interface connection 240 that connects the first extension 220 with the second extension 220.

If desired, the interface connection 240 may include a length adjustment device 320 that couples the first extension 220 with the second extension 220 and that is configured to adjust a distance between the first extension 220 and the second extension 220.

Figure 10:
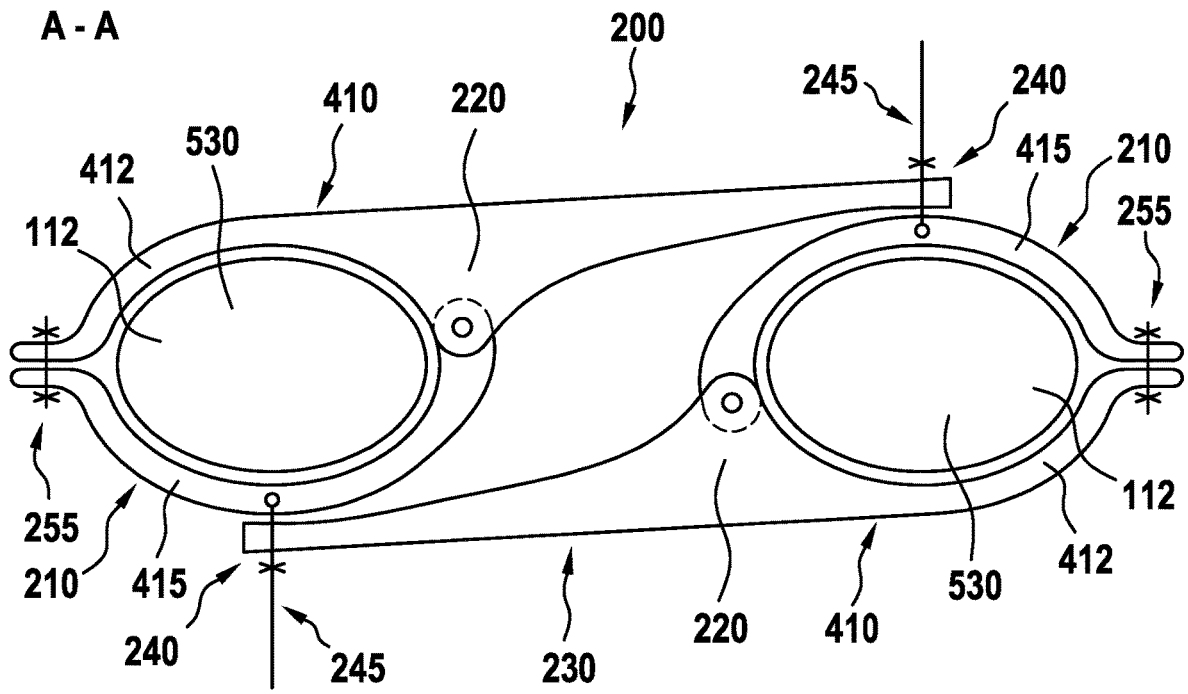
FIG. 10 is a diagram of a cross section of an illustrative pitch angle blocking device with two non-circular clamps, two extensions, and two interface connections in accordance with some embodiments.

FIG. 10 is a diagram of a cross section of an illustrative pitch angle blocking device 200 with a connecting device 230 that non-rotatably connects first and second attachment means 210 in accordance with some embodiments.

As an example, consider the scenario in which the multi-blade rotor (e.g., multi-blade rotor 110 of FIG. 2 or 3) includes as first and/or second receiving means 510 a non-circular cross section 530 of the first and/or second rotor blades 112.

In this scenario, the first attachment means 210 may include a non-circular clamp 410 with first and second clamping arms 412, 415 and a fastener 255 that is configured to non-rotatably and releasably attach the first and second clamping arms 412, 415 of the non-circular clamp 410 with each other such that the non-circular clamp 410 encompasses the first rotor blade 112.

The second attachment means 210 may include an additional non-circular clamp 410 with first and second clamping arms 412, 415 and an additional fastener 255 that is configured to non-rotatably and releasably attach the first and second clamping arms 412, 415 of the additional non-circular clamp 410 with each other such that the additional non-circular clamp 410 encompasses the second rotor blade 112.

The non-circular clamp 410 and the additional non-circular clamp 410 may be shape fitting clamps that prevent a rotation of the respective first and second rotor blades 112 relative to the respective non-circular clamps 410 when the respective non-circular clamps 410 are attached to the respective first and second rotor blades 112.

The fastener 255 and/or the additional fastener 255 may include at least one of a threaded rod, a nut, a bolt, a pin, a quick release pin, a bearing, a spherical washer, or an elastic element. As an example, a bolt and an associated nut may attach the first and second clamping arms 412, 415 of the non-circular clamp 410 with each other. Similarly, another bolt and another associated nut may attach the first and second clamping arms 412, 415 of the additional non-circular clamp 410 with each other.

Illustratively, the connecting device 230 may include a first extension 220 that extends from the first attachment means 210. If desired, the connecting device 230 may include a second extension 220 that extends from the second attachment means 210.

By way of example, the connecting device 230 may include at least one interface connection 240 that connects the first extension 220 with at least one of the second attachment means 210 or the second extension 220. As shown in FIG. 10, the connecting device 230 includes two interface connections 240. A first interface connection 240 may connect the first extension 220 with the second attachment means 210, and a second interface connection 240 may connect the second extension 220 with the first attachment means.

The two interface connections 240 may each include at least one interface fastener 245. If desired, the two interface connections 240 may include at least one of a screw, a nut and bolt, a threaded rod, or a rivet.

As shown in FIG. 10, each one of the two interface connections 240 includes as interface fastener 245 a threaded rod and a nut. Thus, a first threaded rod is connected to the clamping arm 415 of the non-circular clamp 410 via a bearing or a spherical washer, and a second threaded rod is connected to the clamping arm 415 of the additional non-circular clamp 410 via a bearing or a spherical washer.

The threaded rod passes through a hole in the respectively adjacent extension 220, and a nut is threaded onto the threaded rod to fasten the extension 220 with clamping arm 415.

Figure 11:
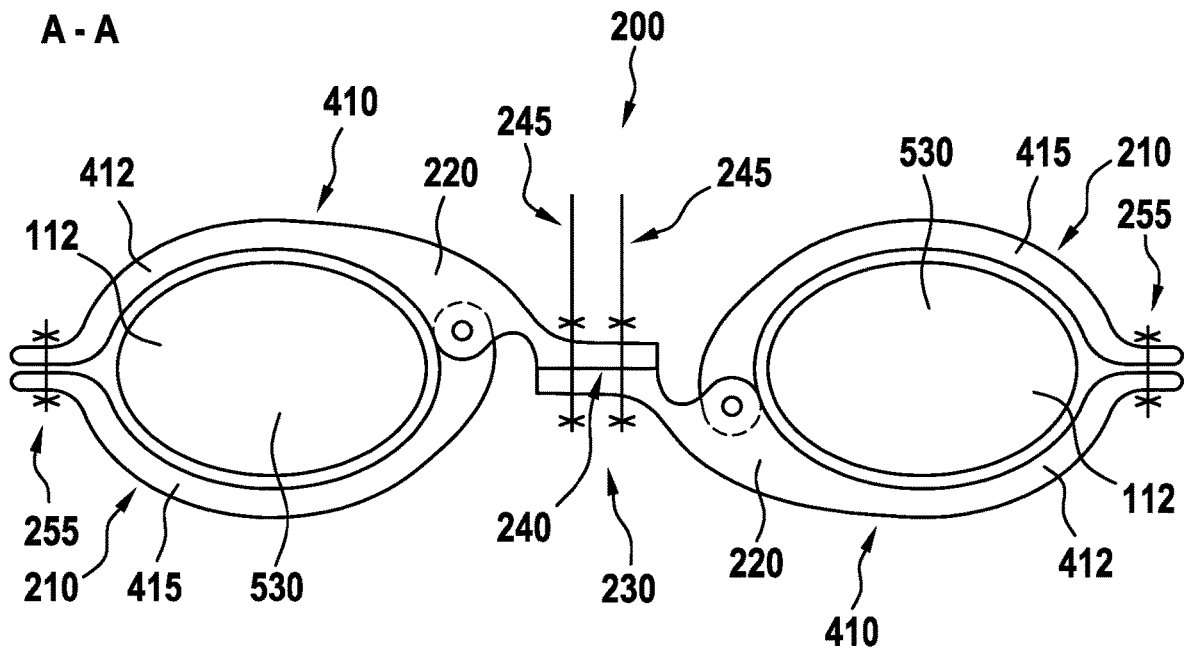
FIG. 11 is a diagram of a cross section of an illustrative pitch angle blocking device with two non-circular clamps, two extensions, and one interface connection in accordance with some embodiments.

FIG. 11 is a diagram of a cross section of an illustrative pitch angle blocking device 200 with a connecting device 230 that non-rotatably connects first and second attachment means 210 in accordance with some embodiments.

The pitch angle blocking device 200 of FIG. 11 differs from the pitch angle blocking device of FIG. 10 at least in the connecting device 230. As shown in FIG. 11, the connecting device 230 has first and second extensions 230 with a different cross section shape and a different interface connection 240 than the connecting device 230 of FIG. 10.

Illustratively, the interface connection 240 may include at least one interface fastener 245 that couples the first extension 220 with the second extension 220. As shown in FIG. 11, the interface connection 240 may include two interface fasteners 245.

By way of example, the at least one interface fastener 245 may include one or more threaded rods. The interface connection 240 may constrain two degrees of freedom if two or more threaded rods are used.

As shown in FIG. 11, the at least one interface fastener 245 may include two threaded rods and two corresponding bolts. If desired, the two threaded rods may be threaded into threaded holes in the first and/or second extensions.

Figure 12:
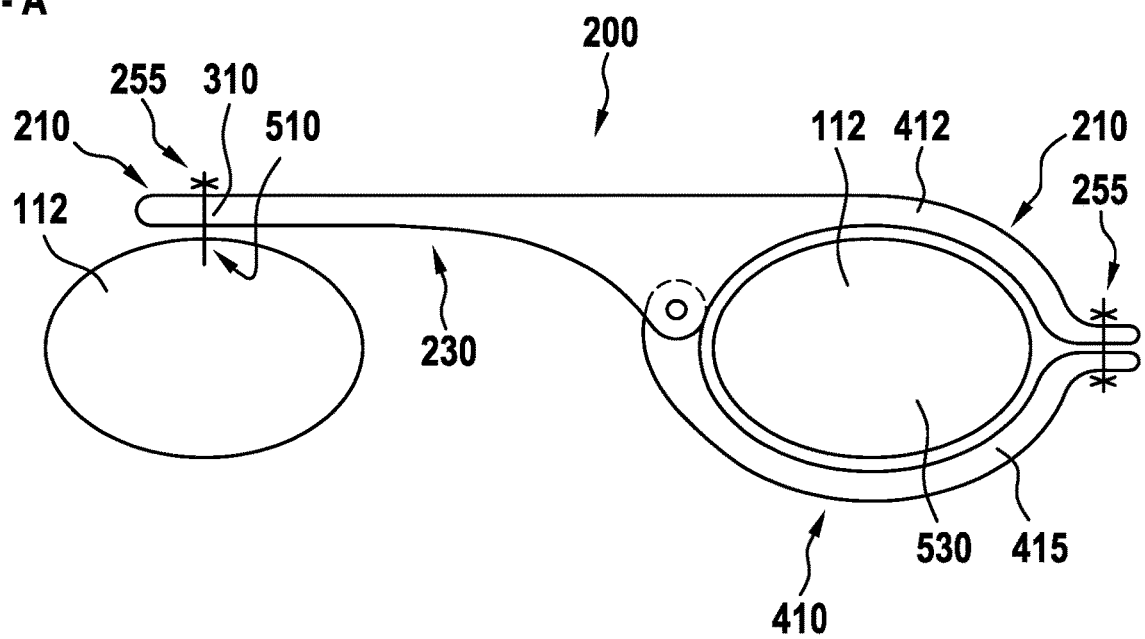
FIG. 12 is a diagram of a cross section of an illustrative pitch angle blocking device with a non-circular clamp, a strut, and one extension in accordance with some embodiments.

FIG. 12 is a diagram of a cross section of an illustrative pitch angle blocking device 200 with a connecting device 230 that non-rotatably connects first and second attachment means 210 in accordance with some embodiments.

The first attachment means 210 may include a non-circular clamp 410 with first and second clamping arms 412, 415. The second attachment means 210 may include a strut 310. Illustratively, the non-circular clamp 410, the strut 310, and the connecting device 230 are integrally formed.

The first attachment means 210 may further include a fastener 255 that is configured to non-rotatably and releasably attach the first and second clamping arms 412, 415 of the non-circular clamp 410 with each other such that the non-circular clamp 410 encompasses the first rotor blade 112. The second attachment means 210 may further include an additional fastener 255 that is configured to non-rotatably and releasably attach the strut 310 to the second rotor blade 112.

The fastener 255 and/or the additional fastener 255 may include at least one of a threaded rod, a nut, a bolt, a pin, a quick release pin, a bearing, a spherical washer, or an elastic element.

By way of example, the first rotor blade 112 may include first receiving means at a first location that is spaced apart from the rotor hub and configured to receiving at least a portion of the first attachment means 210. For example, the first receiving means 510 may include a non-circular cross section of the first rotor blade 112 at the first location.

The second rotor blade 112 may include a second receiving means 510. The second receiving means 510 may include at least one of a threaded rod, a bearing, an elastic element, a threaded hole, or a non-threaded hole.

Illustratively, the additional fastener 255 and the associated second receiving means 510 may be selected to include an elastic element, a bearing, or spherical washers such that the second rotor blade 112 can transfer torsion moments to the pitch angle blocking device 200. If desired, the additional fastener 255 may be selected to be a threaded rod. However, in this case, the pitch angle blocking device 200 may be able to constrain a single degree of freedom of the multi-blade rotor.

Figure 13:
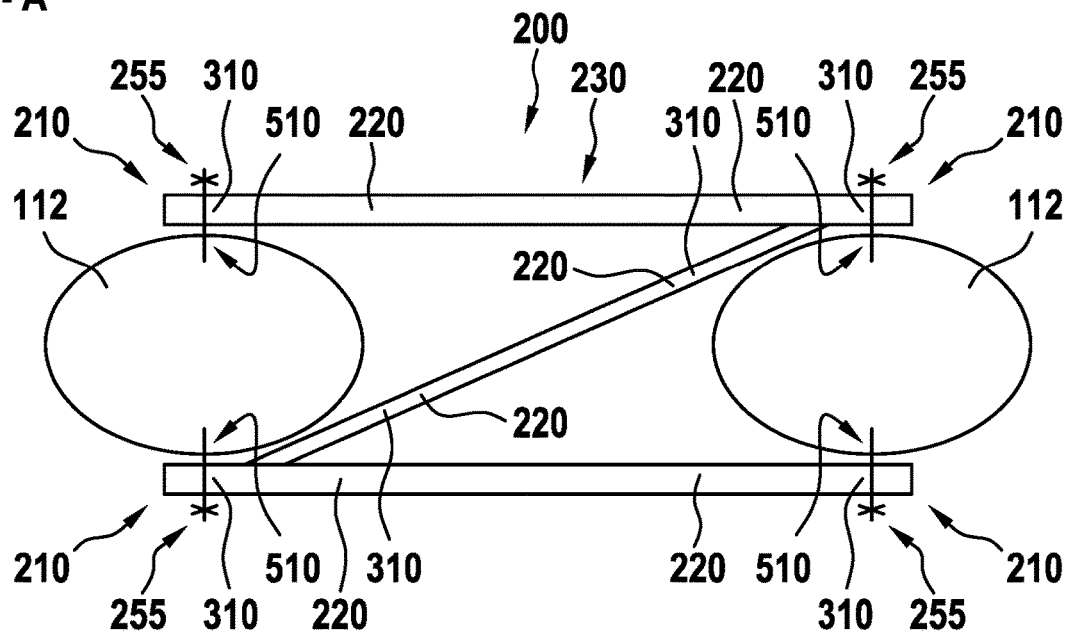
FIG. 13 is a diagram of a cross section of an illustrative pitch angle blocking device with six struts and three connecting devices in accordance with some embodiments.

FIG. 13 is a diagram of a cross section of an illustrative pitch angle blocking device 200 with a connecting device 230 that non-rotatably connects first and second attachment means 210 in accordance with some embodiments. As shown in FIG. 13, the illustrative pitch angle blocking device 200 includes six struts 310 and three extensions 220.

The first half of the six struts 310 (i.e., three struts 310) form the first attachment means 210 that are configured to be non-rotatably and releasably attached to the first rotor blade 112. The second half of the six struts 310 (i.e., three other struts 310) form the second attachment means 210 that are configured to be non-rotatably and releasably attached to the second rotor blade 112.

By way of example, the first rotor blade 112 may include first receiving means 510. The first receiving means 510 may be located at a first location that is spaced apart from the rotor hub. For example, the first receiving means 510 may include at least one of a threaded rod, a bearing, an elastic element, a threaded hole, or a non-threaded hole. As shown in FIG. 13, the first rotor blade 112 may include receiving means 510 in the upper and in the lower portion.

The second rotor blade 112 may include second receiving means 510. The second receiving means 510 may include at least one of a threaded rod, a bearing, an elastic element, a threaded hole, or a non-threaded hole. As shown in FIG. 13, the second rotor blade 112 may include receiving means 510 in the upper and in the lower portion.

Illustratively, fasteners 255 and the associated receiving means 510 may fasten the struts 310 to the rotor blades 112.

As shown in FIG. 13, each one of the first half of the six struts 310 has an associated extension 220, and each one of the second half of the six struts 310 has an associated extension 220 that is connected and integrally formed with an associated one of the first half of the six struts 310 and its associated extension 220.

Thus, a strut 310 that is attached to the first rotor blade 112, its associated extension 220, a strut 310 that is attached to the second rotor blade 112, and its associated extension 220 form a single bigger strut that connects the first and second rotor blades 112. Illustratively, the pitch angle blocking device 200 of FIG. 13 includes three bigger struts that each are formed by a strut 310 that is attached to the first rotor blade 112, a strut 310 that is attached to the second rotor blade 112, and the respectively associated extensions 220.

Illustratively, a first one of the three bigger struts may be attached to the upper portions of the first and second rotor blades 112, a second one of the three bigger struts may be attached to the lower portions of the first and second rotor blades 112, and a third one of the three bigger struts may be attached to the lower portion of the first rotor blade 112 and to the upper portion of the second rotor blade 112. If desired, the third one of the three bigger struts may be attached to the upper portion of the first rotor blade 112 and to the lower portion of the second rotor blade 112.

In other words, the first one and the second one of the three bigger struts may be attached horizontally to the multi-blade rotor, and the third one of the three bigger struts may be attached diagonally to the multi-blade rotor. Three or more of the bigger struts may constrain two degrees of freedom if at least one of the three bigger struts is attached horizontally to the multi-blade rotor and another one of the three bigger struts is attached diagonally to the multi-blade rotor. Thus, the pitch angle blocking device 200 of FIG. 13 may constrain two degrees of freedom.

Figure 14:
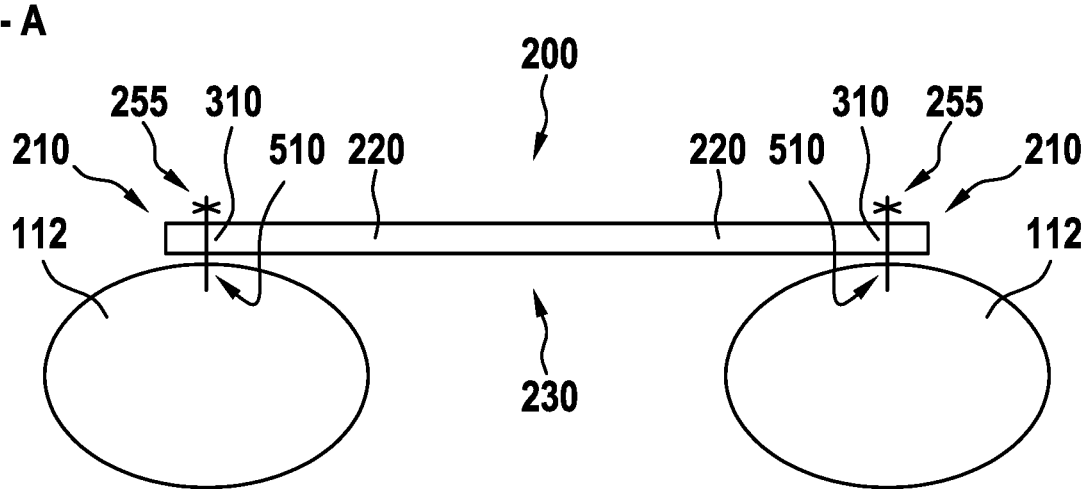
FIG. 14 is a diagram of a cross section of an illustrative pitch angle blocking device with two struts and one connecting device in accordance with some embodiments.

FIG. 14 is a diagram of a cross section of an illustrative pitch angle blocking device 200 with a connecting device 230 that non-rotatably connects first and second attachment means 210 in accordance with some embodiments. As shown in FIG. 14, the illustrative pitch angle blocking device 200 includes two struts 310 and a connecting device 230.

Illustratively, the two struts 310 and the connecting device 230 are integrally formed. Thus, the two struts 310 and the connecting device 230 form a single bigger strut that is attached to the first and second rotor blades 112. As shown in FIG. 14, the single bigger strut may be attached to the same side of the first and second rotor blades 112.

As an example, the single bigger strut may be attached to the upper portions of the first and second rotor blades 112. As another example, the single bigger strut may be attached to the lower portions of the first and second rotor blades 112. Illustratively, the single bigger strut may correspond to one of the two horizontally arranged bigger struts of the pitch angle blocking device 200 of FIG. 13.

A fastener 255 may attach each one of the two struts 310 to a respective rotor blade 112. The fasteners 255 may include at least one of a threaded rod, a nut, a bolt, a pin, a quick release pin, a bearing, a spherical washer, or an elastic element. In order to allow some rotation angle between the struts 310 and the rotor blades 310, the fastener preferably includes bearings, spherical washers, elastic elements, or sufficient clearance from the rotor blades 112. Thereby, the bigger strut may constrain one degree of freedom.

If the fasteners 255 tightly attach the struts 310 and the blades 112 with each other, then the pitch angle blocking device 200 may constrain two degrees of freedom. However, the fasteners 255 need to be sized relatively large to control two degrees of freedom.

Figure 15:
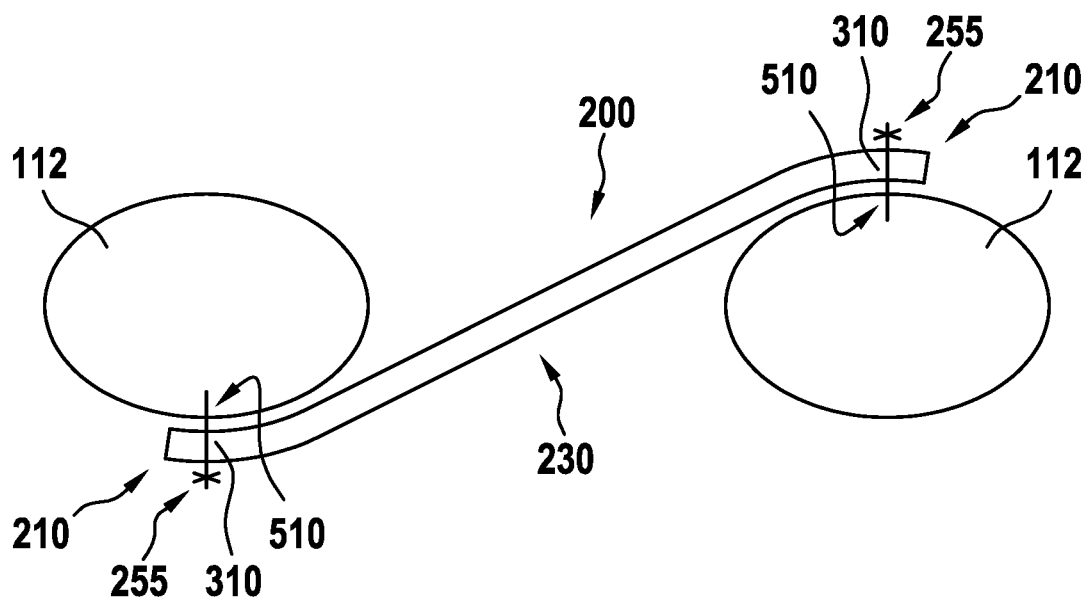
FIG. 15 is a diagram of a cross section of an illustrative pitch angle blocking device with two struts that are attachable to opposite sides of the rotor blades in accordance with some embodiments.

FIG. 15 is a diagram of a cross section of an illustrative pitch angle blocking device 200 with a connecting device 230 that non-rotatably connects first and second attachment means 210 in accordance with some embodiments. The illustrative pitch angle blocking device 200 of FIG. 15 is similar to the pitch angle device 200 of FIG. 14 in that it includes two struts 310 and a connecting device 230. However, contrary to the pitch angle blocking device 200 of FIG. 14, the pitch angle blocking device 200 of FIG. 15 includes two struts that are attachable to opposite sides of the rotor blades 112.

Thus, the two struts 310 and the connecting device 230 are integrally formed and form a single bigger strut that is attached to opposite sides of the first and second rotor blades 112. As an example, the single bigger strut may be attached to the upper portion of the first rotor blade 112 and to the lower portion of the second rotor blade 112. As another example, the single bigger strut may be attached to the lower portion of the first rotor blade 112 and to the upper portion of the second rotor blade 112. Illustratively, the single bigger strut may correspond to the diagonally arranged bigger struts of the pitch angle blocking device 200 of FIG. 13.

Figure 16:
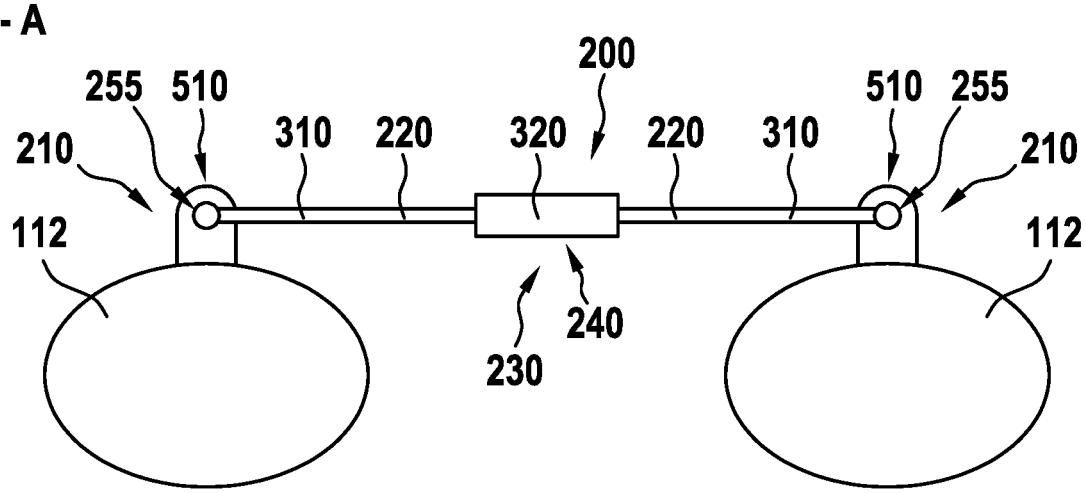
FIG. 16 is a diagram of a cross section of an illustrative pitch angle blocking device with two struts, and a length adjustment device in accordance with some embodiments.

FIG. 16 is a diagram of a cross section of an illustrative pitch angle blocking device 200 with a connecting device 230 that non-rotatably connects first and second attachment means 210 in accordance with some embodiments. As shown in FIG. 16, the illustrative pitch angle blocking device 200 includes two struts 310 and a connecting device 230.

Fasteners 255 may be configured to non-rotatably and releasably attach the struts 310 to the first and second rotor blades 112. For example, the first and second rotor blades 112 may include receiving means 510 for receiving the fasteners 255. The receiving means 510 may include holes, hooks, snap hooks, brackets, clamps, plates, or any combination thereof.

Illustratively, the fasteners 255 may include attachment means for attaching the struts 310 to the receiving means 510 of the first and second rotor blades 112. As an example, the fasteners may include hooks or snap hooks that are hooked into holes of the first and second rotor blades 112. As another example, the receiving means 510 may include eyelets that are connected with hooks, snap hooks, or clamps of the fasteners 255.

Illustratively, the connecting device 230 may include a first extension 220 that extends from the first attachment means 210. If desired, the connecting device 230 may include a second extension 220 that extends from the second attachment means 210.

By way of example, the connecting device 230 may include at least one interface connection 240 that connects the first extension 220 with the second extension 220. The at least one interface connection 240 may include a length adjustment device 320 that couples the first extension 220 with the second extension 220. The length adjustment device 320 may be configured to adjust a distance between the first extension 220 and the second extension 220.

Figure 17:
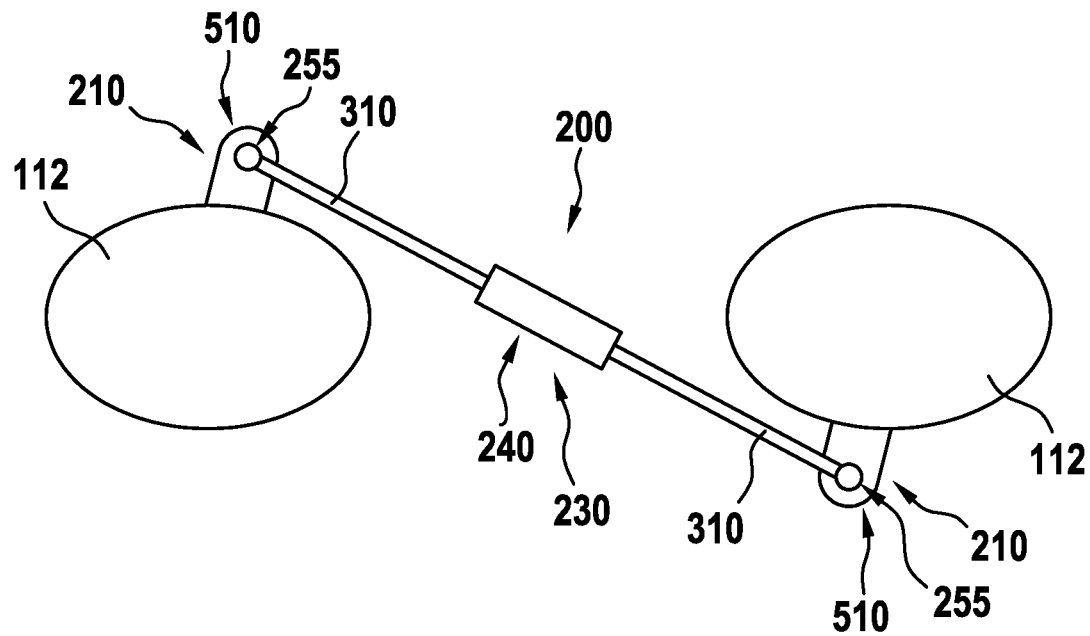
FIG. 17 is a diagram of a cross section of another illustrative pitch angle blocking device with two struts, and a length adjustment device in accordance with some embodiments.

FIG. 17 is a diagram of a cross section of an illustrative pitch angle blocking device 200 with a connecting device 230 that non-rotatably connects first and second attachment means 210 in accordance with some embodiments. The illustrative pitch angle blocking device 200 of FIG. 17 is similar to the pitch angle device 200 of FIG. 16 in that it includes two struts 310 and a connecting device 230 that includes a length adjustment device 320. However, contrary to the pitch angle blocking device 200 of FIG. 16, the pitch angle blocking device 200 of FIG. 17 includes two struts 310 that are attachable to opposite sides of the rotor blades 112.

As an example, the first strut 310 may be attached to the upper portion of the first rotor blade 112, and the second strut 310 may be attached to the lower portion of the second rotor blade 112. As another example, the first strut 310 may be attached to the lower portion of the first rotor blade 112, and the second strut 310 may be attached to the upper portion of the second rotor blade 112.

Figure 18:
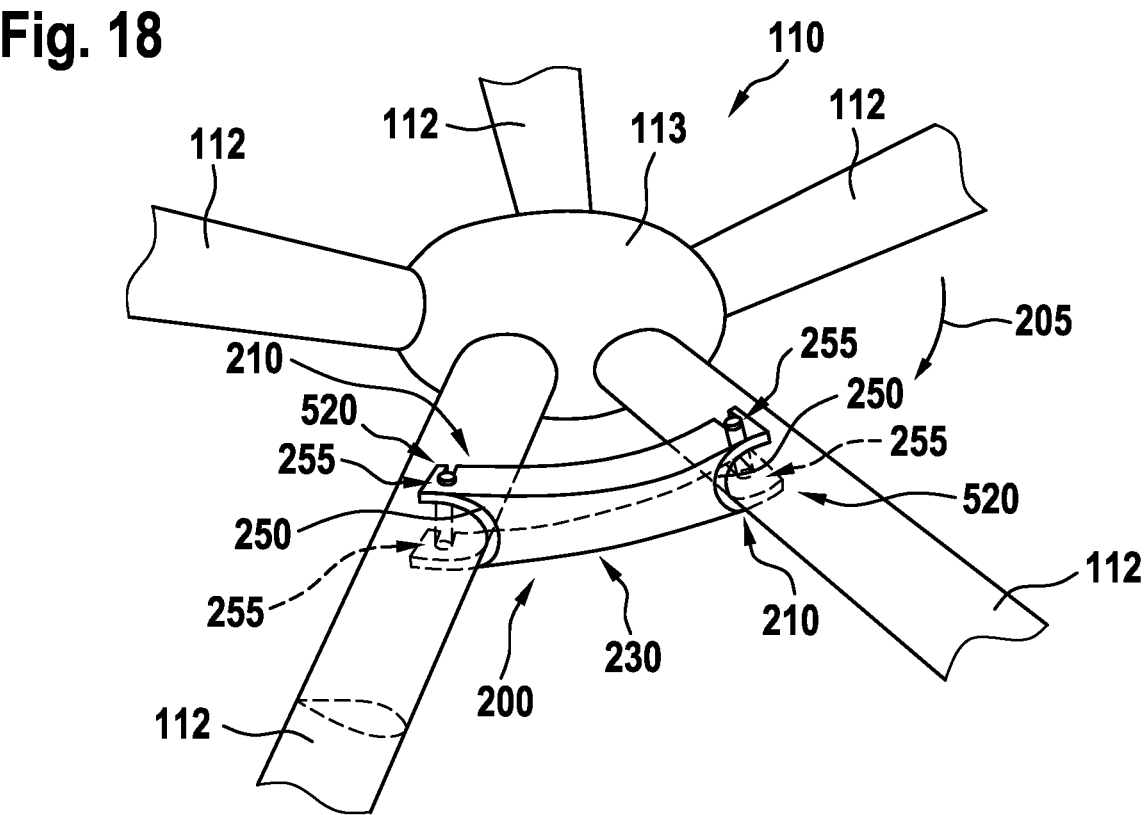
FIG. 18 is a three-dimensional diagram of an illustrative multi-blade rotor with a pitch angle blocking device having two brackets and an extension in accordance with some embodiments.

FIG. 18 is a three-dimensional diagram of an illustrative multi-blade rotor 110 of a rotary-wing aircraft (e.g., helicopter 100 of FIG. 1). The multi-blade rotor 110 may be adapted to receiving a pitch angle blocking device 200 for blocking the pitch angle of the multi-blade rotor 110 in non-operational mode of the rotary-wing aircraft.

Illustratively, the multi-blade rotor 110 includes a rotor hub 113 and neighboring first and second rotor blades 112 in circumferential direction 205 that extend from the rotor hub 113.

By way of example, the first rotor blade 112 includes first receiving means at a first location 520 that is spaced apart from the rotor hub 113 and configured to receiving at least a portion of a first attachment means 210 of the pitch angle blocking device 200. The second rotor blade 112 includes second receiving means at a second location 520 that is spaced apart from the rotor hub 113 and configured to receiving at least a portion of the second attachment means 210 of the pitch angle blocking device 200.

The pitch angle blocking device 200 may include two brackets 250 and a connecting device 230. The two brackets 250 and the connecting device 230 may be integrally formed.

Fasteners 255 may be configured to attach the two brackets 250 to the first and second rotor blades 112. For example, the fasteners 255 may include pins in slots, slots on rails, or similarly aligned solutions to which the pitch angle blocking device 200 may be slid onto the first and second rotor blades 112 from the outside towards the rotor hub 113.

It should be noted that the above described embodiments are merely described to illustrate possible embodiments of the present disclosure, but not in order to restrict the present disclosure thereto. Instead, multiple modifications and variations of the above described embodiments are possible and should, therefore, also be considered as being part of the disclosure.

For instance, the pitch angle blocking device 200 of FIG. 13 is shown with three bigger struts: two bigger struts that are arranged horizontally, and one bigger strut that is arranged diagonally. However, the pitch angle blocking device 200 of FIG. 13 may have one horizontally arranged bigger strut and two diagonally arranged bigger struts instead, if desired.

Moreover, the diagonally arranged bigger strut of FIG. 13 is shown to have a smaller diameter than the horizontally arranged bigger struts. However, the diagonally arranged bigger strut may have the same diameter or a greater diameter than the horizontally arranged bigger struts.

Furthermore, the non-circular clamps 410 of FIGS. 10 to 12 are shown to have approximately elliptical shapes. However, the non-circular clamps 410 could have any other form of shape fitting with non-circular cross sections that are state of the art for transferring torsion loads.

If desired, more than two degrees of freedom of a multi-blade rotor may be constrained, for example by applying an additional pitch angle blocking device between a different pair of rotor blades of the multi-blade rotor. However, when the number of constrained degrees of freedom is more than the initial number of degrees of freedom without the pitch angle blocking devices, then one has to take care not to overload the elements of the pitch control system (e.g., by installing elastic elements at the locations of the fasteners).

REFERENCE LIST

- 100 rotary-wing aircraft
- 110 multi-blade rotor
- 112 rotor blade
- 113 rotor hub
- 114 rotor head
- 115 rotor shaft
- 117 rotor axis
- 119 rotor plane
- 120 fuselage
- 123 cabin
- 127 rear fuselage
- 130 tail boom
- 135 horizontal stabilizer
- 140 counter-torque device
- 145 tail rotor
- 150 fin
- 200 pitch angle blocking device
- 205 circumferential direction
- 210 attachment means
- 220 extension
- 230 connecting device
- 240 interface connection
- 245 interface fastener
- 248 slot
- 250 bracket
- 255 fastener
- 310 strut
- 320 length adjustment device
- 410 clamp
- 412, 415 clamping arm
- 510 receiving means
- 520 location
- 530 non-circular cross section

What is claimed is:

1. A pitch angle blocking device for blocking a pitch angle of a multi-blade rotor of a rotary-wing aircraft in non-operational mode of the rotary-wing aircraft, the multi-blade rotor having neighboring first and second rotor blades in circumferential direction that extend from a rotor hub that is rotatable around a rotor axis in a rotor plane, comprising:
   first attachment means configured to be non-rotatably and releasably attached to the first rotor blade spaced apart from the rotor hub;
   second attachment means configured to be non-rotatably and releasably attached to the second rotor blade spaced apart from the rotor hub; and
   a connecting device that extends along the rotor plane in the circumferential direction directly between the first attachment means and the second attachment means and non-rotatably connects the first attachment means with the second attachment means.

2. The pitch angle blocking device of claim 1 wherein the first attachment means further comprises:
   a bracket that at least partially encompasses the first rotor blade, and at least two fasteners that are configured to non-rotatably and releasably attach the bracket to the first rotor blade.

3. The pitch angle blocking device of claim 2 wherein the second attachment means further comprises:
   an additional bracket that at least partially encompasses the second rotor blade, and at least two additional fasteners that are configured to non-rotatably and releasably attach the additional bracket to the second rotor blade.

4. The pitch angle blocking device of claim 3 wherein the fastener and the additional fastener comprise at least one of a threaded rod, a nut, a bolt, a pin, a quick release pin, a bearing, a spherical washer, or an elastic element.

5. The pitch angle blocking device of claim 3 wherein the at least one of the bracket, the additional bracket, and the connecting device are integrally formed.

6. The pitch angle blocking device of claim 1 wherein the connecting device further comprises:
   a first extension that extends from the first attachment means; and
   a second extension that extends from the second attachment means.

7. The pitch angle blocking device of claim 6 wherein the connecting device further comprises:

at least one interface connection that connects the first extension with at least one of the second attachment means or the second extension.

8. The pitch angle blocking device of claim 7 wherein the at least one interface connection further comprises:
   a length adjustment device that couples the first extension with the at least one of the second attachment means or the second extension and that is configured to adjust a distance between the first extension and the at least one of the second attachment means or the second extension.

9. The pitch angle blocking device of claim 7 wherein the at least one interface connection further comprises:
   at least one interface fastener that couples the first extension with the at least one of the second attachment means or the second extension.

10. The pitch angle blocking device of claim 9 wherein the at least one interface fastener comprises at least one of a screw, a nut and a bolt, a threaded rod, or a rivet.

11. The pitch angle blocking device of claim 9 wherein the at least one interface connection further comprises:
   a slot in the first extension through which the at least one interface fastener is adapted to slide for enabling a displacement of the first extension relative to the at least one of the second attachment means or the second extension.

12. A multi-blade rotor of a rotary-wing aircraft that is adapted to receiving a pitch angle blocking device of claim 1 for blocking the pitch angle of the multi-blade rotor in non-operational mode of the rotary-wing aircraft, comprising:
   the rotor hub; and
   the neighboring first and second rotor blades in the circumferential direction that extend from the rotor hub, wherein the first rotor blade comprises first receiving means at a first location that is spaced apart from the rotor hub and configured to receiving at least a portion of the first attachment means of the pitch angle blocking device; and the second rotor blade comprises second receiving means at a second location that is spaced apart from the rotor hub and configured to receiving at least a portion of the second attachment means of the pitch angle blocking device.

13. The multi-blade rotor of claim 12 wherein the first receiving means comprise at least one of a threaded rod, a bearing, an elastic element, a threaded hole, or a non-threaded hole.

14. The multi-blade rotor of claim 12 wherein the second receiving means comprise a non-circular cross section of the second rotor blade at the second location.

15. A rotary-wing aircraft comprising a multi-blade rotor of claim 12.

16. The pitch angle blocking device of claim 1 wherein the connecting device extends between the neighboring first and second rotor blades along a connecting direction that extends along the rotor plane including circumferential directions of the neighboring first and second rotor blades and sequent to each of the circumferential directions of the neighboring first and second rotor blades.

17. A pitch angle blocking device for blocking a pitch angle of a multi-blade rotor of a rotary-wing aircraft in non-operational mode of the rotary-wing aircraft, the multi-blade rotor having neighboring first and second rotor blades in circumferential direction that extend from a rotor hub that is rotatable around a rotor axis in a rotor plane, comprising:
   a first fastener configured to be non-rotatably and releasably attached to the first rotor blade spaced apart from the rotor hub;
   a second fastener configured to be non-rotatably and releasably attached to the second rotor blade spaced apart from the rotor hub; and
   a connecting device that extends along the rotor plane in the circumferential direction directly between the first fastener and the second fastener and non-rotatably connects the first fastener with the second fastener.

* * * * *